G. N. EASTMAN.
DRY BATTERY CELL.
APPLICATION FILED AUG. 12, 1908.
912,946.
Patented Feb. 16, 1909.
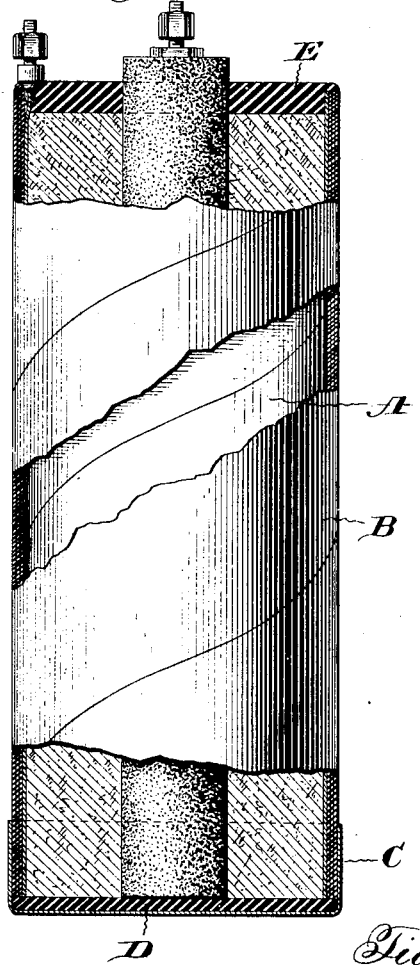
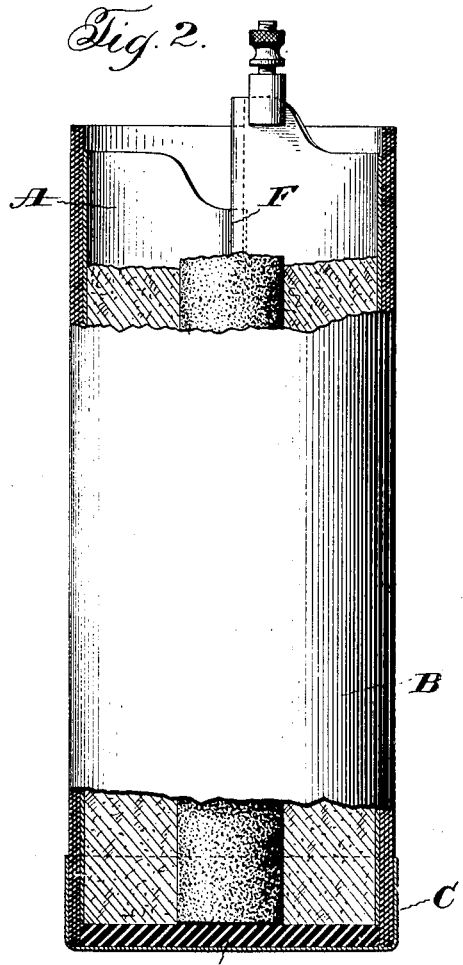
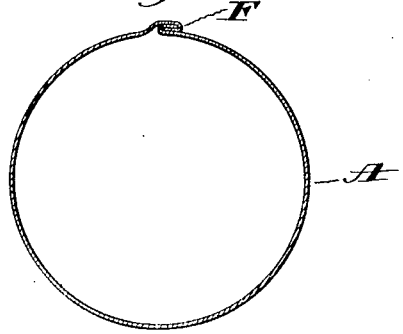
Witnesses.
Jas. E. Hutchinson
E. P. Corbett
Inventor:
George N. Eastman
By Eugene C. Brown Attorney

UNITED STATES PATENT OFFICE.

GEORGE N. EASTMAN, OF RIVERSIDE, CALIFORNIA.

DRY-BATTERY CELL.

No. 912,946.  Specification of Letters Patent.  Patented Feb. 16, 1909.

Application filed August 12, 1908. Serial No. 448,144.

*To all whom it may concern:*

Be it known that I, GEORGE N. EASTMAN, a citizen of the United States, residing at Riverside, in the county of Riverside and State of California, have invented certain new and useful Improvements in Dry-Battery Cells, of which the following is a specification.

My invention relates to improvements in dry battery cells and pertains more particularly to a novel method of constructing dry cells whereby a container is obtained which will be impervious to the electrolyte even in the event of the entire consumption of the cylindrical electrode incased in said container. It is a common fault in batteries of this type that the electrolytic fluid very frequently leaks and spreads over the outer surface of the battery, thereby short-circuiting the same. Where a number of cells are connected in series the leaking of the electrolyte often short-circuits a part or all of the cells. Aside from this, the loss of the electrolyte not only shortens the life of the cell but reduces its electromotive-force.

The container in this case is made of a fibrous material dipped in an impregnating compound of a self-adhering nature. The impregnated fiber not only adheres better to the sealing material than metal does, and forms a practically liquid proof seal, but it adheres to the cylindrical electrode and adequately protects it from corrosion while, at the same time, insulating it from adjacent cells where connected in series.

A further object of this invention is to avoid the use of solder in joining the ends of the cylindrical electrode, which eliminates the possibility of damage being caused by local action between the metals used in the solder and the metal of the electrode. This difficulty I may overcome by employing interlocking flanges on the ends of said cylindrical electrode as hereinafter described, or by causing the ends of the cylinder to abut and be held in this position by the container. This common difficulty may also be obviated by winding zinc on a mandrel of a machine in the form of a continuous spiral strip and by having means for simultaneously covering the zinc with spirally wound strips of the impregnated fibrous material. This forms a continuous tubular article which may be cut off to desired lengths. In the first form the zinc is in sheets of less width than the impregnated material and is wrapped in said material so as to provide an insulating space at either end, whereas in the spirally wound form the zinc and the impregnated fiber have their ends flush. A metal cap is utilized for closing one end of the tube, which cap may be held in place by placing therein a heated material similar to the impregnating material of the container. This material serves as insulation in the form where the container edge and the zinc edge are flush. If desired, the cap may be formed of material similar to the container. The seal may also be formed of the impregnating material.

In the accompanying drawing and description thereof I have shown the preferred forms of my invention, in which—

Figure 1 is an elevation of my improved form of cell showing the cylindrical electrode and container formed of spiral strips, with parts broken away; Fig. 2 is an elevation of my battery, with parts broken away, having the cylindrical electrode and its container formed of sheets of different width; and Fig. 3 is a cross-sectional view showing the interlocking flanges used in the form illustrated in Fig. 2.

Referring more in detail to the drawings in which similar characters of reference designate corresponding parts;—A designates a tubular metal electrode which may be formed of a strip of sheet metal wound spirally as shown in Fig. 1. In this construction the electrode A is incased in a fibrous material B impregnated with asphaltum or with a substance having similar qualities of insulation and adhesion. In this form the fibrous material B is a strip and is spirally wound upon the electrode. In the process of construction it is intended to use a single machine for impregnating the fibrous material with the solution, winding the tubular electrode to the desired form and simultaneously winding the adhesive material on the metal electrode thereby forming a tube of permanent shape which is practically continuous and which may be cut to the desired lengths. When the desired length of tube is obtained, it may be closed at one end by a cap C, which may be formed of metal or of the fibrous incasing material, or, in fact, of any material calculated to resist the action of the electrolyte. If a metal is used it should be partially filled with the impregnating material, as at D, which not only insulates it from the electrode and removes it from contact with the electrolyte but which causes the cap to adhere strongly to the tube. When the carbon electrode and the excitant filling are in place the other end may be sealed with impregnating fluid, as at E, completely covering the metal electrode. It will be readily seen that a homogeneous incasing structure is formed by the impregnating fluid which is impervious to the electrolyte and thereby prevents breakage.

In Fig. 2 is shown a modified form of my invention in which the electrode A is formed from a sheet of metal rolled to tubular form. The ends of this metal sheet may be joined together by interlocking flanges as shown at F in Fig. 3 or they may simply abut and be held in this relation by the incasing sheet B. The sheet B in this form of the invention is preferably of a relative width to provide a space between either of its ends and the ends of the metal electrode A. The space at the bottom of the tube is filled with the impregnating material D in the cap C. The space at the top is filled with the seal as in Fig. 1, showing the battery assembled in its complete form.

The employment of a metal cap C will be appreciated by those familiar with electrolytic cells of this type, since it adds very materially to the strength and rigidity of the cell at the base portion where the cell is particularly liable to be damaged. Moreover, in packing the cells for transportation and in storing them also, the rim or flange of the cap resists the pressure from the sides and relieves the fibrous casing.

It is clear that various modified constructions, other than those shown in the drawings, such as are consistent with the claims appended, may be used by me.

Having now described my invention, I claim:—

1. The method of making dry batteries which consists in winding a sheet metal electrode into tubular form, incasing said electrode with a self-adhering fibrous material, closing one end of said tube, introducing the excitant filling and electrode and sealing the tube.

2. The method of making dry battery receptacles or cups which consists in winding a sheet metal electrode into tubular form, incasing said electrode in a self-adhering fibrous material and closing one end of the tube with a metal cap insulated from said electrode.

3. The method of making dry battery receptacles or cups, which consists in forming a tubular metal electrode, incasing said electrode in a liquid-proof self-adhering fibrous material, and closing one end with a liquid-proof cap.

4. The method of making dry battery cups which consists in constructing a metal electrode of tubular form and incasing said electrode in an adhesive fibrous material of sufficient rigidity to preserve the form of said electrode.

5. The method of forming dry battery cups which consists in spirally winding metal and fibrous strips in superimposed relation to form a continuous tube, cutting said tube to required lengths, and capping one end of said tube.

6. The method of forming dry battery cups which consists in spirally winding a metal electrode and fibrous strips simultaneously in superimposed relation to form a continuous tube, cutting said tube into required lengths, and capping one end of each tube.

7. The method of forming dry battery cups which consists in spirally winding a metal electrode and fibrous strips simultaneously in superimposed relation to form a continuous tube, cutting said tube into required lengths, and closing one end of each tube with a cap partially filled with an insulating material of an adhesive nature.

8. The combination, in a dry battery cup, of a tubular electrode formed from spirally wound sheet metal, a casing for said electrode spirally wound upon and adhering to said electrode, and a cap impervious to an electrolyte closing one end of said tube.

9. The combination, in a dry battery cup, of a tubular electrode of spirally wound metal, a spirally wound adhesive casing holding said electrode to form, and a closure for one end of the tube, said casing and said closure being impervious to an electrolyte.

10. The combination, in a dry battery cup, of a tubular electrode of metal, a self-adhering incasing material therefor, and a metal cap closing one end thereof, said incasing material and said cap being impervious to an electrolytic fluid.

11. The combination, in a dry battery cup, of a tubular electrode, an impervious non-conducting incasing material, and a metal closure cap having an insulating lining.

12. The combination, in a dry battery cup, of a tubular electrode, an impervious incasing material, and a closure cap partly filled with an insulating material of an adhesive nature, said cap forming the bottom of the battery cup and surrounding the bottom of the incasing material.

In testimony whereof I affix my signature in presence of two witnesses.

GEORGE N. EASTMAN.

Witnesses:
CLARENCE A. FRY,
JULIA R. ISERLOH.